Figure 1:
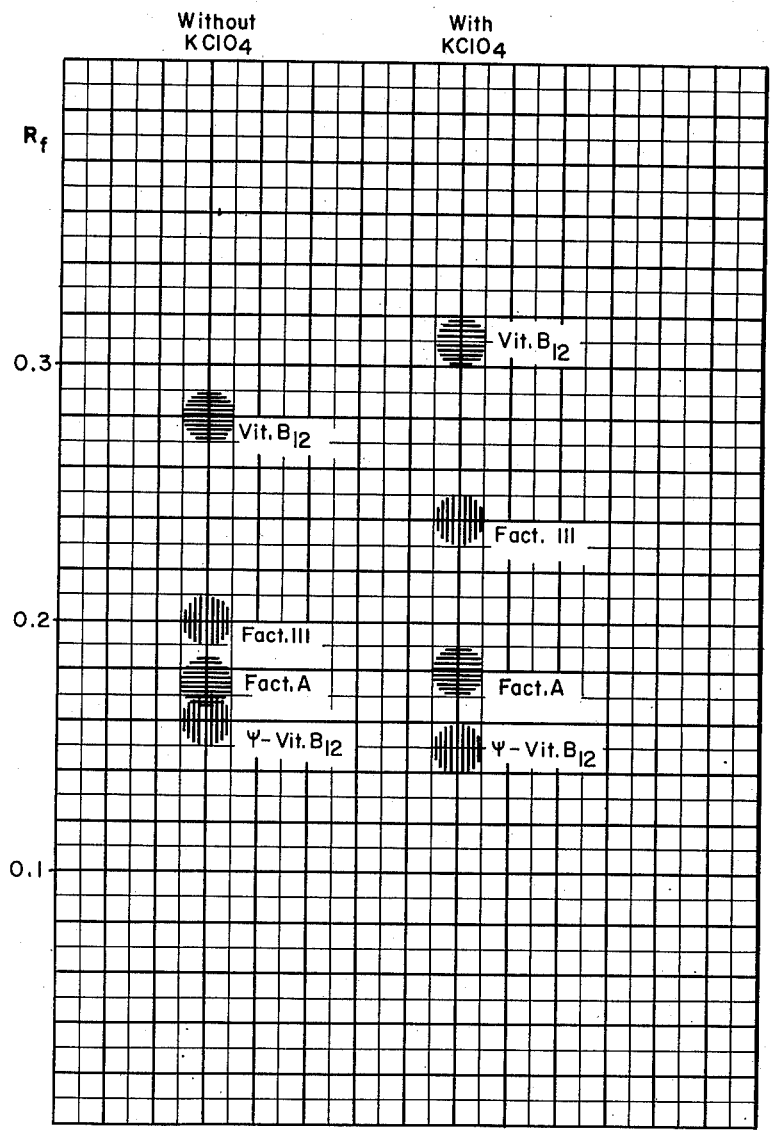

United States Patent Office 2,809,148
Patented Oct. 8, 1957

2,809,148

PROCESS FOR PURIFYING AND SEPARATING B$_{12}$-GROUP-VITAMINS BY PARTITION CHROMATOGRAPHY ON CELLULOSE COLUMNS

Konrad Bernhauer and Wilhelm Friedrich, Aschaffenburg, Germany, assignors to Aschaffenburger Zellstoffwerke Aktiengesellschaft, Redenfelden, Upper Bavaria, Germany, a corporation of Germany Application December 7, 1954, Serial No. 473,714

Claims priority, application Germany December 10, 1953

16 Claims. (Cl. 167—81)

This invention relates to a process for purifying and separating B$_{12}$-group-vitamins by partition chromatography on cellulose columns.

In the isolation of vitamin B$_{12}$ and other factors of the B$_{12}$-group and after adsorption, elution, extraction, and precipitation processes, a rather complicated composition of different kinds of vitamin B$_{12}$ is often obtained, in particular if digested sludge is used as starting material (see W. Friedrich and K. Bernhauer, Angewandte Chemie 65, 627 (1953); K. Bernhauer and W. Friedrich (Aschaffenberger Zellstoffwerke A. G.), DBP 922 126). Very effective processes are required for the further purification and separation of these compositions since the individual components mostly differ only very little from one another in chemical and physical respect. In most cases such compositions do not crystallize; and in case crystallization does take place mixed crystals are obtained because mostly part of the B$_{12}$-group-vitamins is isomorphous (for instance vitamin B$_{12}$ and factor III).

At present, the separation of such compositions with the aid of countercurrent distribution is hardly practicable on a technical scale as it would require very complicated apparatuses and very great amounts of solvents. For some time in adsorption chromatographic methods aluminum oxide has been used as adsorbent and different organic liquids (mixtures of water and acetone respectively diethylene dioxide (dioxan) or methyl alcohol) have been used as solvents (eluents). When that method has been applied to compositions of vitamin B$_{12}$-factors obtainable from digested sludge and which always contain four kinds of vitamin B$_{12}$ at the least, it has only been successful when the development was carried out using acetone of increasing water content in the presence of cyanide, whereby it was possible to separate the faster migrating kinds of vitamin B$_{12}$. The factor III thus obtained, however, always contained, even when crystallized, among other substances, considerable amounts of vitamin B$_{12}$. It was extremely difficult—also when using a developer containing a great quantity of water—to elute the factors V which migrate even more slowly (see W. Friedrich and K. Bernhauer, Angewandte Chemie 65, 627 (1953)).

Of the partition chromatographic systems, silica-gel together with aqueous alcohols respectively phenols has so far mostly been employed. Thus vitamin B$_{12}$ has been purified (see E. Lester Smith and L. F. J. Parker, Biochem. Soc., Proc. of 9.5. 1948; E. Lester Smith, W. F. J. Cuthbertson, A. Walker and K. A. Lees, Fed. Proc. 9, No. 1 (1950); K. H. Fantes, J. E. Page, L. F. J. Parker and E. Lester Smith, Proc. Roy. Soc. B 136, 592 (1950)) in silica-gel columns using n-butyl alcohol, n-propyl alcohol, and isopropyl alcohol of suitable water contents as developers, eventually adding phenol or cresol. Furthermore it has been tried in this way to separate the vitamin-B$_{12}$-active substances from feces (see U. J. Lewis, D. F. Tappan and C. A. Elvehjem, J. Biol. Chem. 194, 539 (1952); J. E. Ford and J. W. G. Porter, Biochem. J. 51, Proc. V. (1952)), employing therewith water-saturated n-butyl-alcohol respectively sec. butyl alcohol as developer, but without obtaining any satisfactory effect.

When this method was applied to vitamin B$_{12}$-factors from digested sludge and alcohols having the usual water content and completely miscible with water as well as cyanide as developer were used, a separation was not obtained. Water-saturated sec. butyl alcohol acted similarly under the same conditions. A partial separation was obtained by using water-saturated n-butyl alcohol. In this case it was, however, necessary to employ great quantities of the developer, and the process lasted several days.

In some cases, starch was used for separating vitamin B$_{12}$ and B$_{12b}$ instead of silica-gel (see E. Lester Smith and L. F. J. Parker, Biochem. Soc. Proc. of May 29, 1948; E. Lester Smith, W. F. J. Cuthbertson, A. Walker and K. A. Lees, Fed. Proc. 9, No. 1 (1950)). But starch columns have proved a failure in separating compositions of B$_{12}$-group-vitamins from digested sludge, as diffuse chromatograms without the formation of zones were always obtained.

Now, in accordance with the present invention, the surprising and important observation has been made that chromatographic columns of cellulose in the form of powder or flakes are exceedingly well suited for separating complicated compositions of B$_{12}$-group-vitamins.

Heretofore, cellulose has only been employed (in the form of strips respectively sheets of paper) in paper chromatography of B$_{12}$-vitamins, and different developers have been used therewith. Water-saturated n-butyl alcohol which was employed among other substances for separating vitamin B$_{12}$ and desoxyribosides has proved the least suitable. (See W. A. Winsten and E. Eigen, J. Biol. Chem. 177, 989; 181, 109 (1949)). It was furthermore used for separating vitamin B$_{12}$ and the factors WAB, WR and B$_{12}$ (see H. G. Wijmenga, Dissertation, Utrecht (1951)), although 70 hours were required therefor. For separating vitamin B$_{12}$-factors from feces the said developer was also used (see W. J. Lewis, D. F. Tappan and C. A. Elvehjem, J. Biol. Chem. 194, 539 (1952)). An increase of the R$_f$-values being very low, a certain acceleration of the migration velocity resulting therefrom was obtained by saturating the paper strips with 0.66 m. KH$_2$PO$_4$ (see H. G. Wijmenga, Dissertation, Utrecht (1951)). However, the dispersion did not improve essentially thereby since the respective factors were subsequently found to be non-uniform (see E. S. Holdsworth, Nature 171, 148 (1953)). A similar acceleration of the migration velocity could be obtained by adding glacial acetic acid to n-butyl-alcohol-water (see H. G. Wijmenga, Dissertation, Utrecht (1951)). The application of water-saturated sec. butyl alcohol proved an essential advance in paper chromatography. (See K. H. Fantes, J. E. Page, L. F. J. Parker and E. Lester Smith, Proc. Roy. Soc. B 136, 592 (1950)). When applying this system, as well as water-saturated sec. butyl alcohol with an addition of glacial acetic acid, the factors III, A and pseudo vitamin B$_{12}$ either cannot be separated from one another, or the separation is only inadequate (see J. E. Ford, Physiol. Rev., being printed).

These results in paper chromatography—which are as yet rather unsatisfactory—could not serve as a guide in elaborating the process according to the present invention. Both methods, i. e. paper chromatography and column chromatography, differ essentially from each other; and the developers suitable for one method are not always to be applied to the other. Water-saturated n-butyl alcohol for instance proved a complete failure in the paper chromatography of more complicated compositions of vitamin $B_{12}$, whereas water-saturated sec. butyl alcohol yielded fairly satisfactory results. On the other hand, water-saturated sec. butyl alcohol was useless in column chromatography according to the invention, whereas good separations were received in this case by using water-saturated n-butyl alcohol.

As may be seen from the foregoing the kind of developer is of great importance to the chromatography on cellulose columns according to the present invention. Systematic check tests have revealed that particularly favorable effects are obtained under certain conditions explained in the following:

Vitamin 12 and etiocobalamine (see K. Bernhauer and W. Friedrich, Angew. Chem. 66, 776 (1954)) may be separated easily from each other by water-saturated n-butyl-alcohol as developer, though mostly not quantitatively, since the zones of both factors are usually too broad. However, the separation of vitamin $B_{12}$ from the remaining complete factors (see K. Bernhauer and W. Friedrich, Angew. Chem. 66, 776 (1954)) has proved perfect, a broad colorless zone being between them in the chromatographing column. Using this arrangement, a complete separation of the slowly migrating vitamin-$B_{12}$-factors (factor III, factor A, pseudo-vitamin $B_{12}$, factors V) is not possible.

Vitamin $B_{12}$ may be separated as to quantity from etiocobalamine and factors which migrate in a similar way as well as from factor III by water-saturated n-butyl alchol in the presence of certain salts such as for instance perchlorates (e. g. potassium- or sodium-perchlorate). The factors III, A, pseudo, V, etc., however, migrate too slowly and therefore accumulate in too high dilutions in the eluate.

When using sec. butyl alcohol containing water the separation of the different vitamin-$B_{12}$-factors is unsatisfactory. A developer having a water content of 20% has proved most favorable. In this system etiocobalamine and vitamin $B_{12}$ are separated satisfactorily, whereas the slower factors migrate diffusely and are inseparable as to quantity. When the water content of the developer is increased, all zones migrate diffusely; when the water content of the developer is increased, the migration velocity of the zones is too slow.

Excellent separating effects considerably exceeding the results of all other separating methods are obtained by using sec. butyl alcohol containing water in the presence of certain salts, such as for instance potassium or sodium salts of e. g. perchloric acid ($HClO_4$), chloric acid ($HClO_3$), bromic acid ($HBrO_3$), nitric acid ($HNO_3$), hydrogen tetraphenylboron ($H/B(C_6H_5)_4/$), monochloroacetic acid ($ClH_2C.COOH$), dichloroacetic acid ($Cl_2HC.COOH$)

trichloroacetic acid ($Cl_3C.COOH$), monobromoacetic acid ($BrH_2C.COOH$), dibromoacetic acid ($Br_2HC.COOH$)

camphosulphonic acid, benzenesulphonic acid ($C_6H_5SO_3H$)

2,4-dichlorobenzoic acid ($C_6H_3Cl_2COOH$), sulphanilic acid ($H_2N.C_6H_4.SO_3H$), α-naphthalene sulphonic acid ($C_{10}H_7SO_3H$).

The concentration of these salts in the developer should be about 0.002–0.02 mol per 1000 cc. Salts which are very sparingly soluble in the developer are employed as concentrated solutions. This developing system is particularly suitable when operating with increasing water content. A water content of 20–25% permits etiocobalamine and similar factors to migrate well separated, a water content of 25–28% causes the separation and elution of vitamin $B_{12}$ and factors which migrate in a similar way; finally the slowly migrating $B_{12}$-kinds (factor III, pseudo-factors, factors V, etc.) are separated and eluted by water-saturated sec. butyl alcohol. Then the chromatography proceeds with maximum speed and separating effect.

Developers containing other alcohols or ketones instead of n-butyl alcohol or sec. butyl alcohol are not suitable for the process according to the invention; they produce either diffuse zones or no zones at all.

By employing salts according to the invention sec. butyl alcohol—being otherwise of no use in chromatographing $B_{12}$-vitamins on cellulose columns—could be made an excellent developer. Sec. butyl alcohol has among others the advantage over n-butyl alcohol of being able to dissolve more water (up to approximately 31% by volume) than n-butyl alcohol (up to approximately 18% by volume), whereby also $B_{12}$-factors migrating more slowly may be developed and eluted with sufficient speed (if more water is added to the developer).

A narrowing and decelerating of the zones containing the $B_{12}$-vitamins is effected—when using n-butyl-alcohol-water as well as sec.-butyl-alcohol-water—by the salts which are used according to the present invention. Both effects may probably be explained by the same cause, i. e. by the formation of complex compounds with $B_{12}$-vitamins. The fact of such complex compounds being formed may be gathered from the literature. Thus perchloric acid forms—though under entirely different conditions, namely in glacial acetic acid—a compound with vitamin $B_{12}$, which compound contains 6 molecules perchloric acid per 1 molecule vitamin $B_{12}$ (see J. F. Alicino, J. Am. Chem. Soc. 73, 4051 (1951)). Complex compounds are formed by certain carbonyl compounds with certain strong acids (e. g. with trichloroacetic acid, dichloroacetic acid, perchloric acid, nitric acid) as well as with certain salts; certain amino-ketones form complex compounds with for instance perchloric acid (see F. Hein "Chemische Koordinationslehre," S. Hirzel-Verlag, Leipzig, 1950, pages 462–467).

The molecules of the various $B_{12}$-kinds charged with the respective ions respectively salts migrate differently—in most cases more slowly—than in uncharged condition (decelerating effect). This retardation of the migration of the chromatographic zones has its most evident effect on the slower factors and is very insignificant with for instance etiocobalamine (see table 1).

Chromatography of vitamins of the $B_{12}$-group on columns of cellulose powder. Developer: Water-saturated n-butyl alcohol containing CN' without respectively with an addition of potassium perchlorate. The numbers given indicate the R-values (mean values).

*Table 1*

| Vitamin $B_{12}$-factor | Developer | |
|---|---|---|
| | without $KClO_4$ | with $KClO_4$ |
| etiocobalamine | 0.5 | 0.4 |
| factor Ia | 0.3 | 0.2 |
| vitamin $B_{12}$ | 0.25 | 0.15 |
| factor III | 0.1 | 0.05 |

Thereby the dispersion of the chromatograms and, owing to this, also the separation of the individual factors is substantially improved. The intensification (narrowing) of the zones may probably be explained by the reduction of diffusion owing to the formation of complex compounds; it also contributes greatly to increase the separating effect.

The following conditions have to be fulfilled by salts increasing the dispersion in cellulose column chromatography: They are neutral (neutral pH-value of aqueous solutions), easily dissociable in water (i. e. they are derived from strong acids), their anions are monobasic and consist of at least 4 non-metal atoms.

Salts not belonging to this group are not suitable. Ammonium salts, for instance, are not suited because of their acid reaction. Salts of weak acids show no effect at all, (in conformity with F. Hein, see above; according to whom only strong acids are capable of forming complex compounds). Salts of multivalent anions, such as, for instance, sulfates and phosphates are likewise unsuited; in most cases sulfates have no remarkable influence, whereas phosphates cause completely diffuse zones.

Figure 2:
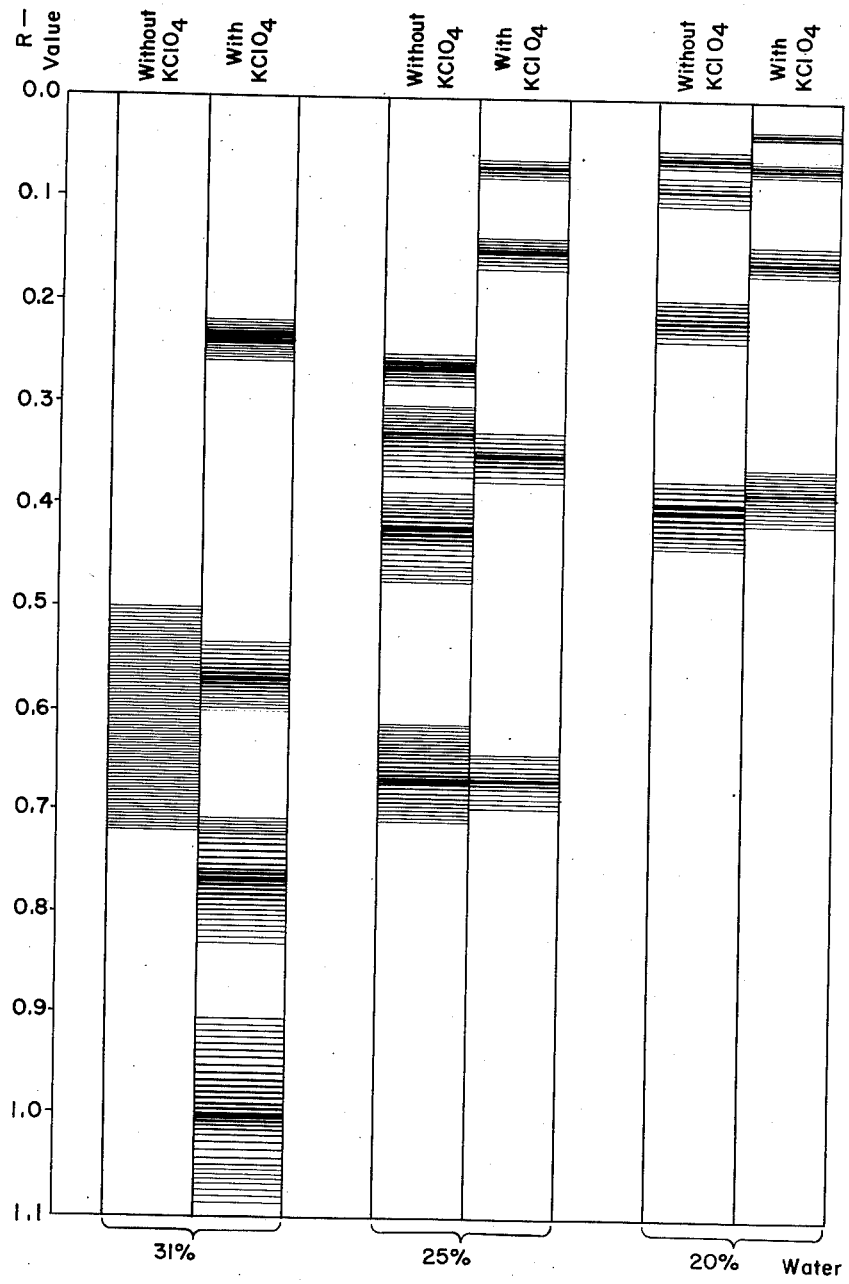

Salts which cause a positive separating effect in cellulose column chromatography also increase the efficiency of paper chromatography. As shown in Fig. 1 the dispersion of the factors vitamin $B_{12}$, factor III, factor A, and pseudo vitamin $B_{12}$ is most substantially increased if the developer (water-saturated sec. butyl alcohol) is saturated with potassium perchlorate. Figure 2 illustrates the effect of various amounts of water in the developer on the separation.

For preparing the column for instance 50 g. cellulose powder Whatman Standard Grade and 500 cc. water-saturated n-butyl alcohol, containing e. g. 0.2–0.5 cc. of an aqueous solution of 10% hydrocyanic acid are shaken—while gradually adding approximately 20 cc. water—until the material is homogeneous. The pulp is filled into the chromatographic column in small portions which are compressed each time by a perforated stamper. When employing sec. butyl alcohol as developer one proceeds in the same way but without using additional water.

The compositions respectively concentrates of $B_{12}$ vitamins to be chromatographed are mostly applied to the columns as dry materials, for instance in the form of a kieselguhr (diatomaceous earth) preparation, (see K. Bernhauer and W. Friedrich, Angew. Chemie 66, 776 (1954)). The dry kieselguhr preparation of $B_{12}$-vitamins is treated with hydrocyanic acid fumes and subsequently filled into the column containing above the cellulose packing a thin layer of e. g. 1–2 centimeters of the developer; it is then covered with a disk of filter paper and finally compressed by the stamper.

As developer there is used water-saturated n-butyl alcohol or hydrated sec. butyl alcohol containing water and a small quantity, for instance 0.4–1.0 cc. of an aqueous solution of 10% hydrocyanic acid per liter. The water to be used for preparing the column as well as the developer should be free of carbonic acid.

In general all chromatographic zones are developed in the same succession, no matter in which way the chromatography is performed. For the best known $B_{12}$-vitamins having n-butyl-alcohol-water as developer this sequence results from the following R-values:

| Vitamin $B_{12}$-factor: | R-value |
|---|---|
| Etiocobalamine | 0.40–0.59 |
| Vitamin $B_{12}$ | 0.21–0.29 |
| $B_{12}$-factor III | 0.08–0.12 |
| $\psi$ vitamin $B_{12}$ | 0.055–0.08 |

The variation of the R-values may be explained by the different quality of the cellulose powder and by contamination of the material to be chromatographed (for instance by salts) whereby the migration speed of the individual zones is effected.

EXAMPLE 1

A slurry consisting of 5 g. cellulose powder, 50 cc. water-saturated n-butanol containing CN'-ions and 2 cc. water was introduced into a chromatographic column (diameter 11.5 mm.) in small portions each of which was separately compressed in the column by means of a perforated punch.

A dry concentrate of $B_{12}$-vitamins obtained from 5 l. of digested sludge in the form of a kieselguhr-preparation was treated with vapor of hydrocyanic acid, introduced into the column and after covering with a sheet of a filter paper compressed with the punch. The column was developed with water-saturated n-butanol containing CN'-ions. During this developing four colored chromatographic zones appeared on the column according to the following sheet:

| Vitamin $B_{12}$-factor: | R-value |
|---|---|
| Etiocobalamine | 0.5 |
| Vitamin $B_{12}$ | 0.25 |
| Factor III | 0.10 |
| Factor V | 0.05 |

The fractions containing vitamin $B_{12}$ and factor III were extracted with water, evaporated in vacuo to a small volume and after addition of acetone allowed to stand whereby the vitamins crystallized as red needles.

EXAMPLE 2

A kieselguhr dry preparation containing various $B_{12}$-vitamins was after addition of some potassium perchlorate well ground and introduced into a chromatographic column according to Example 1. During the developing with water-saturated n-butanol, containing CN'-ions, five chromatographic zones appeared on the column according to the following sheet:

| Vitamin $B_{12}$-factor: | R-value |
|---|---|
| Etiocobalamine | 0.4 |
| Factor Ia | 0.2 |
| Vitamin $B_{12}$ | 0.12 |
| Factor III | 0.05 |
| Factor V | 0.02 |

EXAMPLE 3

A slurry containing 12 g. of cellulose powder, 120 cc. of water-saturated sec. butanol and 0.24 cc. of an aqueous solution of 10% hydrocyanic acid was introduced in small portions into three chromatographic columns (diameter 11.5 mm.), each of the portions being compressed with a perforated punch. A dry kieselguhr preparation containing about 1 mg. of each of the following vitamin $B_{12}$-factors: etiocobalamine, vitamin $B_{12}$, factor III and pseudo-vitamin $B_{12}$ was introduced into each of the columns. The first of the columns was developed with sec. butanol containing CN'-ions and 31 vol.-percent water; the second column was developed with sec. butanol containing CN'-ions and 25 vol.-percent of water, the third column with sec. butanol containing CN'-ions and 20 vol.-percent of water. For results see Fig. 2 and Table 2.

EXAMPLE 4

Three chromatographic columns prepared according to Example 3 were developed with mixtures of sec. butanol, hydrocyanic acid and water, said mixtures being saturated with potassium perchlorate. The developer of the first column contained 31 vol.-percent of water, the second 25 vol.-percent, the third 20 vol.-percent. For results see Fig. 2 and Table 2.

*Table 2*

Chromatographic separation of some vitamin $B_{12}$-sorts in cellulose powder-columns. Developer: CN'-ions containing sec. butanol with various content of water with and without potassium perchlorate. Diameter of the columns 11.5 mm., height of the columns 65 mm.

| Column No. | Developer vol. Percent | | KClO₄ | R-values of factors | | | | Results |
|---|---|---|---|---|---|---|---|---|
| | sec. butanol | water | | I (etiocobalamine) | II (vitamin B₁₂) | III (factor III) | IV (ψ-vitamin B₁₂) | |
| 1 | 69 | 31 | without | only one diffuse zone | | | | no separation. |
| 2 | 75 | 25 | ---do--- | 0.67 | 0.42 | 0.33 | 0.26 | zones diffuse and too narrow. |
| 3 | 80 | 20 | ---do--- | 0.40 | 0.21 | 0.086 | 0.055 | I and II rather well separated, III and IV diffuse, quantitatively not separable. |
| 4 | 69 | 31 | with | 1.0 | 0.77 | 0.57 | 0.24 | III and IV very well separated. |
| 5 | 75 | 25 | ---do--- | 0.67 | 0.34 | 0.146 | 0.067 | all factors very well separated. |
| 6 | 80 | 20 | ---do--- | 0.38 | 0.15 | 0.058 | 0.027 | quick factors very well separated, the others move too slow. |

EXAMPLE 5

A dry kieselguhr preparation containing etiocobalamine, vitamin B₁₂, factor III and factor V was introduced into a chromatographic column prepared according to Example 4. During the developing with sec. butanol containing 23 vol.-percent of water and traces of CN'-ions and saturated with potassium bromate appeared on the chromatographic column four well separated zones of etiocobalamine, vitamin B₁₂, factor III and factor V, the R-values of which were 0.5, 0.27, 0.18, 0.11 respectively.

EXAMPLE 6

A chromatographic column prepared and fitted with B₁₂-vitamins according to Example 5 was developed with sec. butanol containing 23 vol.-percent of water and traces of CN'-ions and saturated with potassium chlorate. During the developing appeared on the chromatographic columns four well separated zones of etiocobalamine, vitamin B₁₂, factor III and factor V, the R-values of which were 0.55, 0.31, 0.12, 0.07 respectively.

EXAMPLE 7

A chromatographic column prepared and fitted with B₁₂-vitamins according to Example 5 was developed with sec. butanol containing 23 vol.-percent of water, traces of CN'-ions and 0.05% of potassium nitrate. During the developing appeared on the chromatographic column four well separated zones of etiocobalamine, vitamin B₁₂, factor III and factor V, the R-values of which were 0.65, 0.29, 0.14, 0.09 respectively.

EXAMPLE 8

A chromatographic column prepared and fitted with B₁₂-vitamins according to Example 5 was developed with sec. butanol containing 23 vol.-percent of water, traces of CN'-ions and 0.05% of sodium monochloroacetate. During the developing appeared on the chromatographic column four quite well separated zones of etiocobalamine, vitamin B₁₂, factor III and factor V, the R-values of which were 0.61, 0.40, 0.17, 0.1 respectively.

EXAMPLE 9

A chromatographic column prepared and fitted with B₁₂-vitamins according to Example 5 was developed with sec. butanol containing 23 vol.-percent of water, traces of CN'-ions and 0.076% of sodium dichloroacetate. During the developing appeared on the chromatographic column four well separated zones of etiocobalamine, vitamin B₁₂, factor III and factor V, the R-values of which were 0.7, 0.37, 0.14, 0.09 respectively.

EXAMPLE 10

A chromatographic column prepared and fitted with B₁₂-vitamins according to Example 5 was developed with sec. butanol containing 23 vol.-percent of water, traces of CN'-ions and 0.093% of sodium trichloroacetate. During the developing appeared on the chromatographic column four very well separated zones of etiocobalamine, vitamin B₁₂, factor III and factor V, the R-values of which were 0.53, 0.32, 0.13, 0.07 respectively.

EXAMPLE 11

A chromatographic column prepared and fitted with B₁₂-vitamins according to Example 5 was developed with sec. butanol containing 23 vol.-percent of water, traces of CN'-ions and 0.12% of sodium dibromoacetate. During the developing appeared on the chromatographic column four very well separated zones of etiocobalamine, vitamin B₁₂, factor III and factor V, the R-values of which were 0.53, 0.35, 0.10, 0.06 respectively.

EXAMPLE 12

A chromatographic column prepared and fitted with B₁₂-vitamins according to Example 5 was developed with sec. butanol containing 23 vol.-percent of water, traces of CN'-ions and 0.086% of sodium tetraphenylboron. During the developing appeared on the chromatographic column four very well separated zones of etiocobalamine, vitamin B₁₂, factor III and factor V, the R-values of which were 0.51, 0.26, 0.12, 0.06 respectively.

EXAMPLE 13

A chromatographic column prepared and fitted with B₁₂-vitamins according to Example 5 was developed with sec. butanol containing 23 vol.-percent of water, traces of CN'-ions and 0.136% of sodium salt of camphosulphonic acid. During the developing appeared on the chromatographic column four very well separated zones of etiocobalamine, vitamin B₁₂, factor III and factor V, the R-values of which were 0.42, 0.29, 0.09, 0.04 respectively.

EXAMPLE 14

A chromatographic column prepared and fitted with B₁₂-vitamins according to Example 5 was developed with sec. butanol containing 23 vol.-percent of water, traces of CN'-ions and 0.107% of sodium 2,4-dichlorobenzoate. During the developing appeared on the chromatographic column four very well separated zones of etiocobalamine, vitamin B₁₂, factor III and factor V, the R-values of which were 0.5, 0.28, 0.073, 0.05 respectively.

EXAMPLE 15

A chromatographic column prepared and fitted with B₁₂-vitamins according to Example 5 was developed with sec. butanol containing 23 vol.-percent of water, traces of CN'-ions and 0.115% of sodium alpha-naphthalenesulphonate. During the developing appeared on the chromatographic column four very well separated zones of etiocobalamine, vitamin B₁₂, factor III and factor V, the R-values of which were 0.51, 0.27, 0.11, 0.08 respectively.

EXAMPLE 16

A chromatographic column prepared and fitted with $B_{12}$-vitamins according to Example 5 was developed with sec. butanol containing 23 vol.-percent of water, traces of CN'-ions and 0.098% of sodium salt of sulfanilic acid. During the developing appeared on the chromatographic column four well separated zones.

We claim:

1. A process for purifying and separating $B_{12}$ group vitamins by means of partition chromatography, comprising the steps of preparing a pulp from a cellulose material and a straight chain butyl alcohol containing water, charging the pulp onto a chromatographic column, then charging a mixture of $B_{12}$ vitamin factors onto the column, and developing the chromatogram by adding a water-containing developer comprising a straight chain butyl alcohol, thereby eluting each of the vitamin $B_{12}$ factors contained in said mixture separately.

2. The process according to claim 1, characterized in that the developer contains normal butyl alcohol and has a water content up to and including 18% by volume.

3. The process according to claim 1, characterized in that the developer contains secondary butyl alcohol and has a water content up to and including 31% by volume.

4. The process according to claim 1, characterized in that said cellulose material consists of cellulose powder.

5. The process according to claim 1, characterized in that said cellulose material consists of cellulose flakes.

6. The process according to claim 1, characterized in that said developer contains CN⁻ ions.

7. The process according to claim 1, characterized in that a kieselguhr product of the mixture of $B_{12}$ vitamin factors is charged onto the column.

8. A process for purifying and separating $B_{12}$ group vitamins by means of partition chromatography, comprising the steps of preparing a pulp from cellulose material and a straight chain butyl alcohol containing water, charging the pulp onto a chromatographic column, then charging a mixture of $B_{12}$ vitamin factors onto the column, and developing the chromatogram by adding a water-containing developer comprising a straight chain butyl alcohol and at least one salt of a strong acid, which salt has monobasic anions consisting of at least four non-metal atoms, is easily dissociable in water, and forms aqueous solutions of neutral pH, said developer serving to elute each of the vitamin $B_{12}$ factors contained in said mixture separately, said salt improving the dispersion of said chromatogram.

9. The process according to claim 8, characterized in that said easily dissociable salt is a salt containing a cation selected from the group consisting of sodium and potassium, and an anion selected from the group consisting of perchlorate, tetraphenyl borate, campho sulfonate and trichloracetate.

10. The process according to claim 8, characterized in that said easily dissociable salt is potassium perchlorate.

11. The process according to claim 8, characterized in that said easily dissociable salt is the sodium salt of hydrogentetraphenylboron.

12. The process according to claim 8, characterized in that said easily dissociable salt is the sodium salt of a camphosulfonic acid.

13. The process according to claim 8, characterized in that said easily dissociable salt is the sodium salt of trichloracetic acid.

14. The process according to claim 8, characterized in that the easily dissociable salt is added to the developer before the beginning of the development of the chromatogram.

15. The process according to claim 8, characterized in that a kieselguhr product of the mixture of $B_{12}$ vitamin factors is charged onto the column.

16. A process for purifying and separating $B_{12}$ group vitamins by means of partition chromatography, comprising the steps of preparing a pulp from cellulose material and a straight-chain butyl alcohol containing water, charging the pulp onto a chromatographic column, then charging a kieselguhr product of a mixture of $B_{12}$ vitamin factors onto the column, and thereafter developing the chromatogram by adding a developer containing water, a straight chain butyl alcohol, and at least one easily dissociable salt having a monobasic anion consisting of at least four non-metal atoms, and a monovalent cation selected from the group consisting of sodium and potassium, thereby improving the dispersion of the chromatogram and eluting each of the vitamin $B_{12}$ factors separately from said mixture.

References Cited in the file of this patent

Buchanan: J. of the Chem. Soc. (1950, part III), pp. 2845–2855.

Balston: Guide to Filter Paper and Cellulose Powder Chromatography (1952), pp. 14 and 23.